United States Patent Office 3,340,272
Patented Sept. 5, 1967

3,340,272
INDAZOLIUM SALTS
Robert Frédéric Michel Sureau, Enghien-les-Bains, Gilbert Victor Henri Kremer, Ermont, and Victor Marie Dupré, Louvres, France, assignors, by mesne assignments, to Etablissements Kuhlmann, Paris, France, a corporation of France
No Drawing. Filed Sept. 25, 1961, Ser. No. 140,260
Claims priority, application France, Sept. 30, 1960, 839,994
4 Claims. (Cl. 260—310)

The invention relates to new 1,2-dialkyl 3-halo-indazolium salts of the general formulae:

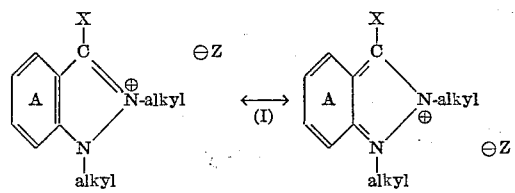

in which the benzene ring A may be substituted by halogen atoms or by non-solubilising groups, the "alkyl" groups may be the same or different, X represents a halogen atom and Z represents a monovalent anion.

Suitable non-solubilising groups which may be mentioned are, for example, alkyl, alkoxy, nitro, cyano, alkylsulphonyl and sulphonamido groups. The "alkyl" groups in positions 1 and 2 are preferably methyl or ethyl groups. Suitable monovalent anions which may be mentioned are, for example, halogen anions and $SO_4CH_3^{\ominus}$ and $SO_4C_2H_5^{\ominus}$ groups.

These salts of the present invention have never been prepared. They may be obtained in excellent yields when 3-halo-N-alkyl-indazoles of Formulae II are treated with an alkylating agent such as alkyl halide, a dialkyl sulphate or a p-toluene alkyl sulphonate.

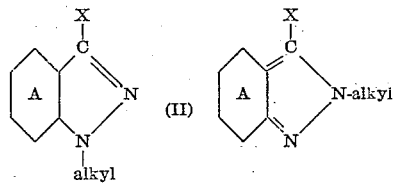

The compounds of Formulae II may themselves be prepared according to known methods, for example, by halogenation of the $N_1$- and $N_2$-alkyl indazole derivatives or again by alkylation, in aqueous or alkaline alcoholic solution by means of the same alkylating agents, of 3-halo-indazoles of the general formulae:

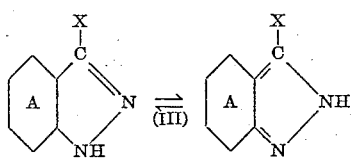

Some of the derivatives of Formulae III have been described; the others may be prepared according to various known general methods: for example, by direct halogenation of the indazoles, as is the case when the benzene ring A is substituted by a nitro group, or again by replacing the hydroxyl group of the 3-indazolones with an atom of halogen according to a process prompted by that indicated in Organic Syntheses, Vol. 29, p. 55 (1949). The quaternary salts of Formula I in which the two "alkyl" groups are the same may also be prepared directly by the action of the same alkylating agents on the 3-halo-indazoles of the Formula III.

The halogen atom in position 3 of the quaternary salts of the Formulae I is remarkably labile. This lability is technically very advantageous, for it enables a large number of new compounds corresponding to one of the general Formulae IV, V and VI to be prepared under particularly mild conditions.

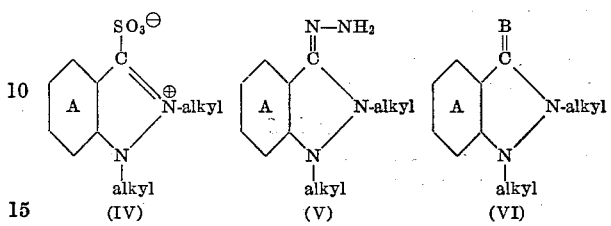

This lability was not foreseeable, since the halogen atom attached at position 3 in the compounds of Formulae II and III is generally very stable with respect to alkaline agents except under particularly severe conditions.

The sulpho-betaines of Formula IV are obtained instantaneously in the cold by the action of a solution of an alkali metal sulphite on an aqueous solution of a compound of Formula I. These sulpho-betaines are very crystalline compounds with little solubility in cold water; they react with hydrazine to give the corresponding hydrazones V.

The 3-indazolinylidene- or indazolone-hydrazones of Formula V are likewise obtained, in practically theoretical yields, by the action of hydrazine hydrate in cold aqueous solution on the salts of Formulae I. In this reaction excess hydrazine may be used in order to neutralise the two molecules of acid liberated, or a mild alkali such as an alkali metal bicarbonate, carbonate or acetate may be employed for this purpose. The hydrazones obtained generally precipitate as crystalline free bases and may be isolated as such. The reaction medium may then be acidified by the addition of mineral acid and the hydrazone salts be precipitated by salting out and cooling.

In the compounds of Formula VI, B represents a divalent atom or radical such as =O, =S, =N—H, =N—alkyl, =N—aryl, =N—NHAlkyl, =N—NHAryl, according to whether a compound of Formulae I is reacted in aqueous or aqueous-alcoholic solution, in the cold or in the hot, respectively with a base or an alkali metal salt of an alkaline base, an alkali metal sulphide, ammonia, an aliphatic or aromatic primary amine or a monosubstituted hydrazine.

The compounds of Formulae I, IV, V and VI may be used as intermediate products for the manufacture of dyestuffs.

The following examples illustrate the present invention without restricting it. The quantities indicated are by weight unless the contrary is stated.

*Example 1*

64 parts of 3-chloro-indazole are dissolved in 800 parts of methanol and 85 parts by volume of a solution of caustic soda containing 400 g. per litre. 78 parts of methyl sulphate are added to this solution at 50–60° C. in a period of half an hour, with stirring and the mixture is maintained at 50–60° C. for 3 hours. The alcohol is then distilled off, the residue is taken up in 1000 parts of water, and the oil which settles is extracted with ether, the ethereal solution is separated and dried, the ether distilled off and the residue distilled in vacuum. 47 parts of N-methyl-3-chloro-indazole are obtained. It is a colourless liquid the boiling point of which is 146° C. under 23 mms. of mercury.

16.75 parts of this liquid are heated for an hour at 50° C. with 18.7 parts of freshly distilled dimethyl sulphate. After cooling, the formation of 1,2-dimethyl-3-chloroindazolium methyl sulphate is observed which is a white product extremely soluble in water and alcohol.

The material obtained is dissolved in 20 parts of water and the solution is gradually introduced at 5° C. into 20 parts by volume of 98% hydrazine hydrate. A pinkish white mass of the salt of 1,2-dimethyl-3-indazolinylidene-hydrazone is rapidly formed. It is left to stand for an hour at 0–5° C., filtered and the solid thoroughly drained and is then dissolved in 600 parts of boiling ethanol. A small quantity of insoluble hydrazine sulphate remains, which is filtered off. On cooling, the 1,2-dimethyl-3-indazolinylidene-hydrazone separates as the hydrochloride in the form of white crystals which are very soluble in water. Melting point: 220° C. Weight obtained: 15.5 parts.

*Example 2*

On treating in the cold the aqueous solution of crude 1,2-dimethyl-3-chloro-indazolium-methyl sulphate obtained in Example 1 with a solution containing excess caustic soda, rapid formation of an oily deposit is observed, which is extracted with ether. The ethereal solution is dried, the ether evaporated and the residue distilled under vacuum, 1,2-dimethyl-3-indazolone is thus obtained in the form of a colourless product which boils at 191° C. under 18 mms. of mercury and melts at 66° C.

*Example 3*

On replacing the caustic soda in Example 2 with a solution of sodium sulphide, a white precipitate of 1,2-dimethyl-3-indazole-thione is immediately obtained. When recrystallised from boiling water this product is in the form of long white needles of melting point 119° C.

*Example 4*

200 parts of 3-chloro-6-nitro-indazole are dissolved at 60–65° C. in 2500 parts of water and 120 parts by volume of caustic soda containing 400 g. per litre. This solution is agitated and 200 parts by volume of dimethyl sulphate and 120 parts by volume of caustic soda containing 400 g. per litre are introduced simultaneously in a period of half an hour. The mixture is maintained at 60–65° C. for 4 hours, left to cool, filtered and the yellow crystalline precipitate formed is washed. This precipitate is a mixture of the isomers —$N_1$— and $N_2$-methyl-3-chloro-6-nitro-indazoles. It is dried at 100° C. Weight obtained: 211 parts. Melting point: 133-135° C.

63 parts of this dry mixture are introduced into 75 parts of freshly distilled methyl sulphate. The mixture is progressively heated with agitation. The mass goes completely into solution towards 120° C., and it is maintained for some minutes at this temperature. The temperature then rises of itself to 140° C. owing to the substantial crystallisation observed. The temperature is maintained for a further 10 minutes at 130–135° C., the product is left to cool, 100 parts of ethyl alcohol are added and it is left overnight in the cold. The solid is filtered off, thoroughly drained, washed with alcohol and dried under vacuum. 94 parts of 1,2-dimethyl-3-chloro-6-nitro-indazolium-sulphomethylate are collected in the form of a white, slightly yellowish product which is very soluble in water.

68 parts of this compound are dissolved in 500 parts of water. The solution is introduced in a period of 45 minutes under the liquid in a stirred mixture of 60 parts of hydrazine hydrate and 400 parts of water at 0° C. The hydrazone precipitates at once in the form of fine beige-brown crystals. After 10 minutes agitation, 120 parts by volume of normal hydrochloric acid are gradually added, then 100 parts of salt. The acidification brings about complete solution. The addition of salt to the yellow solution obtained causes the crystallisation of the hydrochloride of the hydrazone as orange-yellow crystals. Weight of the dry product obtained: 42 parts. It is recrystallised from water for analysis.

Calculated for $C_9H_{12}ClN_5O_2$, percent: C, 41.95; N, 27.2; Cl, 13.78. Found, percent: C, 42.5; N, 27.8, Cl, 13.7.

Ammonia is added to the hydrochloride solution, a precipitate of free hydrazone in the form of fine beige-brown crystals being formed. Melting point: 112–113° C.

*Example 5*

A solution of sodium sulphite is introduced into a solution of 1,2-dimethyl-3-chloro-6-nitro-indazolium-sulphomethylate in stoichiometric amount: crystallisation immediately occurs. The 1,2-dimethyl-6-nitro-indazole-3-sulphobetaine in the form of light beige prismatic needles is obtained in an almost quantitive yield.

Calculated for $C_9H_9O_5N_3S$, percent: C, 39.8; H, 3.32; N, 15.5; S, 11.8. Found, percent: C, 39.6; H, 3.7; N, 15.5; S, 11.2.

*Example 6*

On replacing the sulphite in Example 5 by caustic soda, an orange precipitate of 1,2-dimethyl-6-nitro-3-indazolone is obtained very rapidly in the cold. Melting point: 215° C. (unaltered after recrystallisation from alcohol).

Calculated for $C_9H_9O_3N_3$, percent: C, 52.18; H, 4.35; N, 20.28; O, 23.19. Found, percent: C, 52.5; H, 4.7; N, 20.5; O, 23.3.

*Example 7*

On replacing the sulphite in Example 5 by an equimolecular amount of sodium sulphide, an orange precipitate of 1,2-dimethyl-6-nitro-3-indazolethione is obtained instantaneously. Melting point of crude compound: 237–238° C. Recrystallised from alcohol, melting point: 238–239° C.

*Analysis.*—Calculated for $C_9H_9O_2N_3S$, percent: C, 48.5; H, 4.03; S, 14.33; N, 18.83. Found, percent: C, 48.6; H, 4.38; S, 14.1; N, 19.0.

*Example 8*

With ammonia under the conditions of Examples 5 and 6, 1,2-dimethyl-6-nitro-3-indazolimine is obtained. Orange needles of melting point: 161–162° C.

*Example 9*

On replacing the 3-chloro-6-nitro-indazole in Examples 4, 5, 6, 7 and 8 by 3-chloro-5-nitro-indazole, there are obtained respectively: the mixture of isomers —$N_1$— and —$N_2$ - methyl-3-chloro-5-nitro-indazoles 1,2-dimethyl-3-chloro-5-nitro-indazolium-sulphomethylate,1,2 - dimethyl-5 - nitro - 3 - indazolinylidene-hydrazone (melting point: 149° C.) and its hydrochloride, 1,2-dimethyl-5-nitro-indazole-3-sulphobetaine, 1,2-dimethyl-5-nitro-3-indazolone (orange crystals of melting point 182° C.), 1,2-dimethyl-5 - nitro-3-indazole-thione (orange crystals of melting point 246° C.), 1,2 - dimethyl-5-nitro-3-indazole-imine (orange crystals of melting point 179° C.).

*Example 10*

42 parts of 4-chloro-2-amino-benzoic acid are dissolved in 200 parts of water and 15 parts of sodium carbonate, and then 17.5 parts of sodium nitrite dissolved in 50 parts of water are added and the solution is introduced into 100 parts by volume of concentrated hydrochloric acid, diluted with 200 parts of a mixture of water and ice. The temperature of the mixture must not exceed 10° C. The solution of the filtered diazo compound is immediately poured into a solution prepared by dissolving 97 parts of sodium pyrosulphite and 47.5 parts of sodium carbonate in 250 parts of a mixture of water and ice. During the addition the temperature of the mixture must not exceed 10° C. This mixture is stirred for 3 hours, then heated to 50° C. At this temperature 187 parts by volume of concentrated sulphuric acid are added and the mixture is boiled for two hours. The liquid is diluted with 1000 parts of water and allowed to cool to 25° C. The 6-chloro-3-indazolone which has precipitated is isolated by filtration and dried. Amount obtained: 37.5 parts. White crystalline product of melting point 254° C.

46 parts of phosphorus oxychloride are added in 10 minutes with stirring to a suspension of 33.6 parts of 6- chloro-3-indazolone in 16 parts of pyridine. The mixture is then heated on an oil bath for an hour at 128–130° C., then for 4 hours at 130–140° C. The reaction mixture is cooled to 50° C. and poured on to 500 parts of crushed ice. The 3,6-dichloro-indazole is isolated by filtration, washed with 100 parts by volume of 2% hydrochloric acid, then with 40 parts of cold water. Melting point: 233° C.

On replacing the 3-chloro-indazole in the Examples 1, 2 and 3 by the 3,6-dichloro-indazole thus prepared, there are obtained in a similar manner and successively 1,2-dimethyl-3,6 - dichloro-indazolium methylsulphate, 1,2-dimethyl-6-chloro-3-indazolinylidene hydrazone, 1,2-dimethyl-6-chloro-3-indazolone (white crystalline product with a bluish fluorescence of melting point 88° C.) and 1,2-dimethyl-6-chloro-3-indazole-thione (white crystalline product of melting point 156° C.).

Example 11

100 parts of 6-nitro-3-chloro-indazole are introduced into 126 parts of freshly distilled dimethyl sulphate at 130° C. in a quarter of an hour. The mixture is maintained at 135–140° C. for an hour, allowed to cool to 60° C. and then 500 parts of water are added. It is then maintained at 40° C., neutralised to about pH 6.5 by fractional addition of 51 parts of sodium bicarbonate, filtered at 40° C. and ice is added to the filtrate. A crystalline precipitate is formed which, as in Example 4, is 1-2-dimethyl-3-chloro-6-nitro-indazolium sulphomethylate.

Example 12

20 parts of 6-nitro-3-chloro-indazole in 30.8 parts of diethyl sulphate are heated at 150° C. for 2½ hours. 100 parts of water are added at 60° C., the product is neutralised with 12 parts of sodium bicarbonate, an insoluble residue is filtered off and the filtrate is treated with an excess of caustic soda. An orange-red precipitate of 6-nitro - 1,2 - diethyl-indazolone is rapidly formed. Melting point 145° C. after recrystallisation from boiling water.

Calculated for $C_{11}H_{13}O_3N_3$, percent: C, 56.20; H, 5.53; N, 17.87. Found, percent: C, 56.27; H, 6.28; N, 17.5.

If, instead of the caustic soda, 6.3 parts of anhydrous sodium sulphite are added to the filtered solution above, in portions while stirring, the formation of a yellow precipitate of 6-nitro-1,2-diethyl-indazole-3-sulphobetaine is observed. Dry weight: 9.6 parts.

A paste prepared with 6 parts of this sulphobetaine and 8 parts of water is introduced in portions into a well-stirred mixture comprising 4 parts of hydrazine hydrate and 15 parts of water at a temperature between 0° C. and 5° C. The mixture is stirred for 2½ hours at 5–10° C., then for half an hour at 10–15° C. A brown suspension of 6 - nitro - 1,2 - diethyl-3-indazolone-hydrazone is then formed. It is made acid to pH 3.5 by the addition of 5.7 parts by volume of concentrated hydrochloric acid. All passes into solution except a slight insoluble residue which is filtered off. The filtrate is cooled to 0° C. and to it are added 10 parts of sodium chloride, which brings about the crystallisation of the hydrochloride of the hydrazone. Dry weight: 5.3 parts.

Example 13

40 parts of 3-chloro-6-nitro-indazole are dissolved at 65° C. in 500 parts of water and 24 parts by volume of caustic soda (400 g. per litre), then 80 parts of ethyl sulphate are gradually added at the same temperature. During this addition, the reaction medium is kept neutral by the progressive addition of 24 parts by volume of a solution of caustic soda (400 g. per litre). The mixture is heated for two hours at 70° C. then allowed to cool to normal temperature. The mixture of the two N–1 and N–2 ethyl derivatives insoluble in the reaction medium is isolated by filtration and dried; it melts at 94° C. Quantity obtained: 43 parts.

22 parts of the mixture of the N–1 and N–2 ethyl-3-chloro-6-nitro-indazole derivatives are introduced into 25 parts of methyl sulphate heated to 130° C. by means of an oil bath. The temperature rises to 140° C. The mixture is allowed to cool to 50° C. and then 25 parts of absolute alcohol are added. After cooling to normal temperature, the mixture of $N_1$, $N_2$- and $N_2$, $N_1$-ethylmethyl-3-chloro-6-nitro-indazolium methyl-sulphates is isolated by filtration and dried at normal temperature under reduced pressure. Quantity obtained: 20 parts.

Example 14

19.2 parts of 6-nitro-2-methyl-indazole are dissolved in 100 parts of dimethyl formamide, the solution is cooled to 20° C. and the theoretical amount of gaseous chlorine is passed into the suspension obtained. When all the chlorine is absorbed, the mixture is diluted with 250 parts of water and the yellow precipitate of 6-nitro-3-chloro-2-methyl-indazole is filtered off. Dry weight: 22.2 parts of melting point 180° C. On recrystallisation from acetone, melting point: 182° C.

Analysis.—Calculated for $C_8H_6ClN_3O_2$, percent: C, 45.40; H, 2.84; N, 19.85. Found, percent: C, 45.8; H, 3.3; N, 19.7.

Example 15

On replacing the 6-nitro-3-chloro-indazole in Example 12 by 14.8 parts of 6-nitro-3-chloro-2-methyl-indazole and treating with 21.5 parts of diethyl sulphate, there are prepared in a similar way (1) 6-nitro-1-ethyl-2-methyl-3-indazolone: melting point 153° C.

Analysis.—Calculated for $C_{10}H_{11}O_3N_3$, percent: C, 54.30; H, 4.98; N, 19.0. Found, percent: C, 54.15; H, 5.20; N, 19.0.

(2) 6-nitro-1-ethyl-2-methyl-indazolone-3-sulphobetaine and (3) 6-nitro-1-ethyl-2-methyl-3-indazole-hydrazone hydrochloride.

Analysis.—Calculated for $C_{10}H_{14}ClN_5O_2$, percent: C, 44.20; H, 5.16. Found, percent: C, 44.1; H, 5.38.

6-nitro-1-ethyl-2-methyl-3-indazolethione has melting point 178–180° C.

Example 16

On operating as in Example 14 on a solution of 15.3 parts of 6-nitro-1-methyl-indazole in 50 parts of dimethyl formamide, 18 parts of 6-nitro-1-methyl-3-chloro-indazole of melting point 156° C. are obtained. After two recrystallisations from alcohol, the melting point is 162° C.

Analysis.—Calculated for $C_8H_6ClN_3O_2$, percent: C, 45.40; H, 2.84; N, 19.85. Found, percent: C, 45.8; H, 3.35; N, 19.2.

Example 17

On replacing the 6-nitro-3-chloro-indazole in Example 12 by 14.8 parts of 6-nitro-1-methyl-3-chloro-indazole and treating them with 21.5 parts of diethyl sulphate, there are prepared in similar way (1) 6-nitro-1-methyl-2-ethyl-3-indazolone of melting point 160° C.

Analysis.—Calculated for $C_{10}H_{11}N_3O_2$, percent: C, 54.30; H, 4.98. Found, percent: C, 54.7; H, 5.19.

(2) 6 - nitro-1-methyl-2-ethyl-indazole-3-sulphobetaine and (3) 6-nitro-1-methyl-2-ethyl-3-indazolone-hydrazone hydrochloride; the 6-nitro - 1 - methyl-2-ethyl-3-indazole-thione has melting point 170° C.

Example 18

48.5 parts of 3-bromo-6-nitro-indazole are introduced in a quarter of an hour into 50 parts of dimethyl sulphate at 130° C., and the temperature is then maintained at 135–140° C. for an hour. After cooling, 200 parts of absolute alcohol are added. 6-nitro-1,2-dimethyl-3-bromo-indazolium sulphomethylate crystallises. It is filtered off, washed with absolute alcohol and dried under vacuum. Weight obtained 59 parts, melting point 215° C. This salt, which is very soluble in water, displays the same reactive properties as the corresponding chloro derivative.

We claim:
1. The indazolium salts of the formulae:

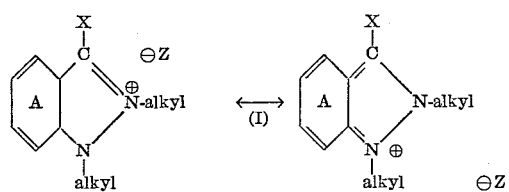

in which the alkyl groups in the 1- and 2-positions are selected from the group consisting of methyl and ethyl, X represents a member selected from the group consisting of chlorine and bromine, the benzene nucleus A is substituted by members selected from the groups consisting of hydrogen, chlorine and bromine atoms and nitro-, cyano-, sulphonamido, lower alkyl, lower alkoxy and lower alkylsulphonyl groups and Z represents a monovalent anion.

2. 3-chloro-1,2-dimethyl-indazolium salts of strong acids.
3. 5-nitro-3-chloro-1,2-dimethyl-indazolium salts of strong acids.
4. 6-nitro-3-chloro-1,2-dimethyl-indazolium salts of strong acids.

References Cited
UNITED STATES PATENTS
3,096,356  7/1963  Jirou et al.

WALTER A. MODANCE, *Primary Examiner.*
DUVAL T. McCUTCHEN, IRVING MARCUS,
*Examiners.*
N. TROUSOF, *Assistant Examiner.*